United States Patent Office 2,832,563
Patented Apr. 29, 1958

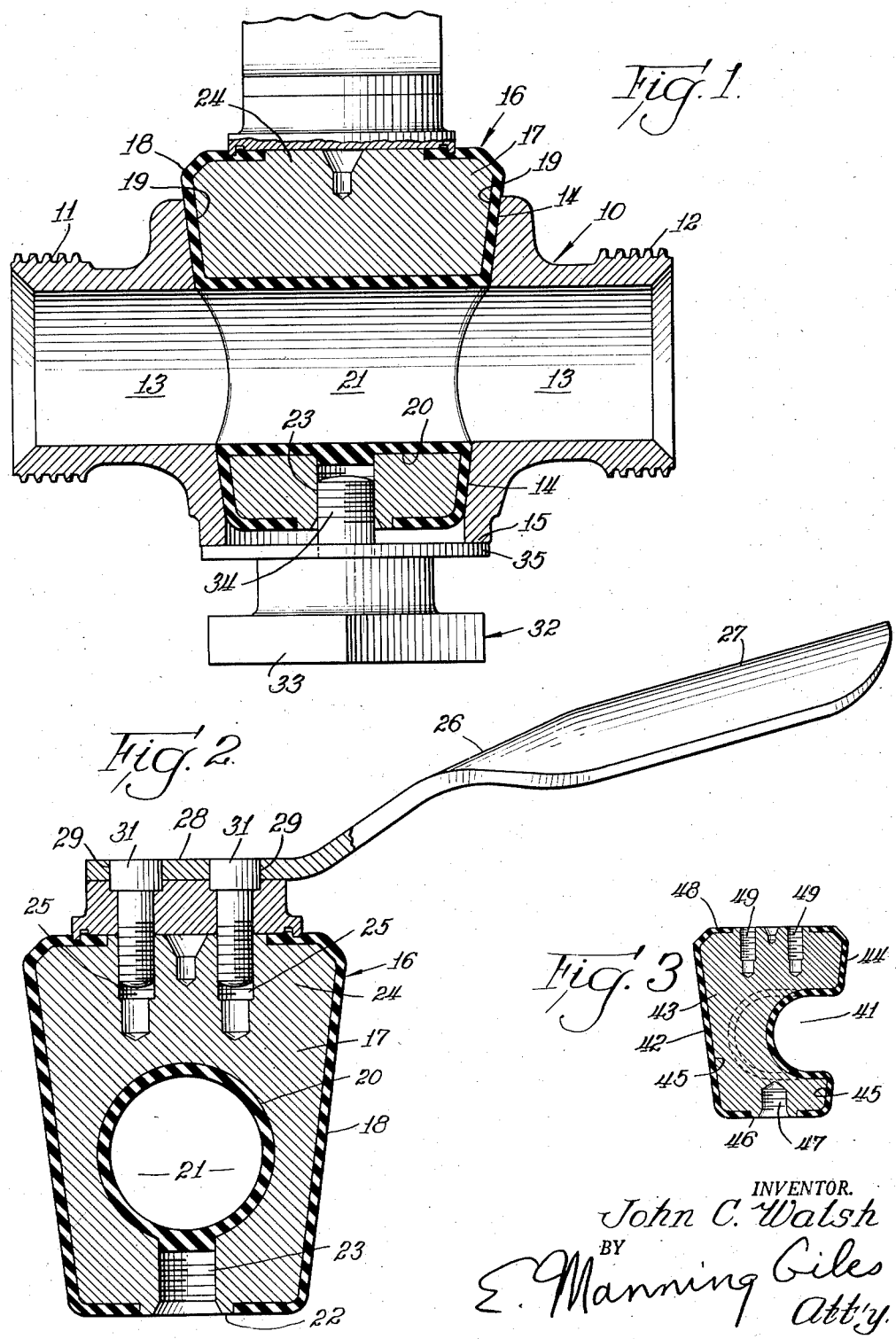

2,832,563

PLUG COCK

John C. Walsh, Cedar Rapids, Iowa, assignor to Cherry-Burrell Corporation, Chicago, Ill., a corporation of Delaware Application June 12, 1956, Serial No. 590,986

3 Claims. (Cl. 251—314)

My invention relates to an improvement in plug cock valves of the type which are taken apart for cleaning or other purposes a great number of times during their life, such as in the dairy industry.

Valves of this type usually require precise machining of the plug cock and of the valve seat so as to insure a snug, leak-proof fit. Often, the plug cocks and valve bodies are numbered to insure that each particular plug cock is replaced after cleaning in the valve seat it was machined to fit. A particular problem with this type of valve has been that through frequent disassembly and handling, the plug cocks often become damaged or scored in some way so that they no longer fit properly in their valve seats, with the result that they leak excessively.

The principal object of my invention is to provide a plug cock which is not easily damaged and which is readily interchangeable with other plug cocks of the same size and type.

Another object is to provide a plug cock which, notwithstanding careless handling, cannot produce any scoring effects in the valve seat.

A further object is to provide a plug cock type valve which is economical to produce and may be made of inexpensive material.

Another object is to provide a plug cock which requires a minimum of machining in its manufacture.

A still further object is to provide a plug cock which will adjust to deformation of the valve body through piping strains and the like.

Another object is to design such a plug cock with a resilient surface but with sufficient backing to prevent channelling under high fluid pressure and to withstand hammering at either end to effectuate seating or unseating in the valve body.

Figure 1 shows a cross sectional view of a plug cock type valve in which the plug cock is in an open position;

Figure 2 shows a cross sectional view of a plug cock and handle in which the passageway through the plug cock is circular; and Figure 3 shows a cross sectional view of a plug cock in which the passageway through the plug cock is positioned on one side of said plug cock.

Referring now to the figures, Figure 1 shows a plug cock type valve wherein the valve body 10 is made of an 18—8 chrome nickel stainless steel which is quite commonly used in the manufacture of valves for use in the dairy industry. On both ends of valve body 10 are threaded portions 11 and 12 which mate with fittings that are connected to pipes used for conducting milk or other fluids. Extending longitudinally through the valve body 10 is a passage 13 which allows the aforementioned milk or other fluids to flow through the valve body. A conical valve seat 14 in the central portion of the valve is substantially perpendicular to the longitudinal axis of the passage 13. Positioned immediately adjacent the smaller end of said valve seat 14 is a shoulder 15.

A plug cock 16 placed in valve seat 14 acts as a means for controlling the flow of fluid through valve body 10.

The plug cock 16 consists of a core 17 and a plastic material cover 18 covering said core.

Core 17 has conical side walls 19 that have the same angle as the valve seat 14 of valve body 10, so that the side walls of the plug cock, after covering with a uniform thickness of rubber or plastic, may mate with the valve seat of the valve body. Extending through the core 17 is a passageway 21 which is substantially perpendicular to the longitudinal axis of core 17 positioned in such a manner that it may register with the passage 13 through the valve body. At the smaller end 22 of core 17 is a drilled and tapped hole 23 which adapts end 22 to receive a retaining member. The opposite end 24 has a pair of drilled and tapped holes 25 to receive fastening means for holding a plug cock turning means.

As may be seen clearly from Figure 2, the plastic cover 18 not noly covers the conical sides 19 but also sidewalls 20 of passageway 21. The cover 18 on conical sides 19 extends unto the sidewalls 20 so that the material of core 17 need not be of a high quality stainless steel since none of the core material comes in contact with the fluid flowing through the valve.

The plastic material cover 18 must be of a type that does not react with dairy products in any way. Furthermore, it must not be soluble in the dairy products so that the milk passing through the valve does not dissolve the cover and carry it away thereby contaminating the milk as well as destroying the valve. The material presently used is a rubber; both natural and synthetic rubbers have been found to be effective.

Attached to plug cock 16 is a handle 26 which has at one end a handle portion 27 and at the other end a fastening portion 28. Extending through said fastening portion 28 is a pair of holes 29 through which pass screws 31 that are fastened in holes 25 to secure handle 26 to plug cock 16.

A knob 32 with a handle 33 at one end has its threaded portion 34 inserted in hole 23 of plug cock 16 after said plug cock is positioned in valve seat 14. Since flange 35 of knob 32 rests against shoulder 15 of the valve body, the plug cock 16 may be brought down into snug engagement with valve seat 14 so that no liquids may leak past the plug cock.

The operation of the valve is very simple. When it is desired to allow fluids to flow through the valve body 10 along passage 13, the passageway 21 of plug cock 16 is turned so that it registers with the passage 13. However, in order to stop the flow of fluid, the plug cock is turned so that the passageway 21 is at right angles to passage 13 which stops the flow of fluid along passage 13.

Another modification of the plug cock is shown in Figure 3. In this particular modification, the plug cock consists of a core 43 and a coating material 44 made of the same material as cover 18. The core 43 has conical sides 45 in the same configuration as the previously described plug cock 16. The smaller end 46 is adapted to receive a retaining means in a drilled and tapped hole 47. The larger end 48 is opposite the smaller end 46 and this larger end 48 has a pair of drilled and tapped holes 49 so that a turning means may be attached thereto. The passageway 41 extends completely through one side of the plug cock so that the resistance to fluid flow is at a minimum in going through the plug cock because of the increased size of the passageway 41. The coating material 44 covers completely the walls of passageway 41 so that the milk flowing therethrough contacts only the coating material.

As may be plainly seen, the plug cock type valve is adapted for use in dairies and dairy farms because it is so easily dismantled and thus cleaned with a minimum of effort. To dismantle the plug cock type valve, the knob 32 is simply removed from the plug cock, and the plug cock is removed from the valve body. The valve body may be easily removed from its fittings because it is simply a threaded connection.

The plug cock type valve presently used in dairies and dairy farms is one which has a plug cock made of stainless steel so that there is no contamination of the food products from the valves. However, employees in dairies and dairy farms that clean the equipment are usually not skilled mechanics and do not appreciate the high degree of care required to prevent damage to the valves. Quite often the valve is dismantled and the valve plug is thrown into a container of cleaning solution with other parts. The careless handling of the plug cock often results in nicks and ridges in the seating surface of the plug cock. When the plug cock is reassembled, the nicks and ridges tend to gall the seating surface of the valve body.

A galled surface in the valve body renders the valve ineffective for two principal reasons. In the first place, the valve has a tendency to leak because a fluid may flow along the gall marks. In the second place, the gall marks are dirt catchers and are very difficult to clean because they are inside the body. Therefore the valve becomes unsound from a sanitary standpoint.

The plug cock in the instant invention relieves the problems that flow from the all stainless steel plug cock. The seating surface of plug cock 16 is a plastic material cover 18. The plastic material which forms cover 18 is preferably a rubber, natural or synthetic, but many other plastic materials may be used as long as their materials do not react with the food product passing through the valve.

When the coated plug cock is co-mingled with other parts, the possibility of nicks and ridges being made in the seating surface thereof is reduced because of the resiliency of the rubber. Furthermore, should there be a nick or ridge made in the seating surface, the rubber material would not gall the valve body when the coated plug cock is reassembled because the stainless steel body is much harder than the coating material.

A further advantage is achieved in the greater economy of the coated plug cock. The stainless steel plug cocks are quite expensive because stainless steel is difficult to machine and the plug cock must be machined to a fine surface and a close tolerance. There is no such expense required in the plug cock which is the subject of this invention. The instant plug cock is made from a core which is cast and rough machined. The core is then coated with the plastic cover material by a molding process which produces a plug cock with a seating surface of a fine finish and made to a close tolerance.

While I have shown and described particular embodiments of my invention it will occur to those skilled in the art that various changes and modifications may be made without departing from my invention and I therefore aim in the appended claims to cover all such changes and modifications as fall within the true spirit and scope of my invention.

I claim:

1. A plug cock of the class described comprising the combination of a core and a handle, said core having somewhat cylindrical sidewalls, a relatively flat end wall at each end, and a laterally disposed passageway communicating with opposed portions of said sidewalls, said sidewalls and passageway being coated with a layer of plastic material, said plastic material being lapped marginally over an end wall to form an annular coating thereon, and said handle having an attaching face overlaying the annular coating of the coated end wall of said core and secured to said core in a manner to cover the inner margin of said annular coating.

2. A plug of the class described comprising the combination of a core and a handle, said core having somewhat cylindrical sidewalls, a relatively flat end wall at each of its ends, and a laterally disposed recess communicating with opposed portions of said sidewalls, said sidewalls and recess being coated with a layer of plastic material, said plastic material being extended inwardly over one end wall, said handle being provided with an attaching face adapted to engage the coated end wall of said core, the attaching face being provided with a ridge adjacent the margin adapted to seat in said plastic coating, and means for securing said contact face to said core in a manner to squeeze the plastic coating between said ridge and the end wall of the core.

3. In a valve of the class described the combination with an elongated valve body having a substantially frustroconical seat disposed laterally therethrough and a longitudinal passage in said valve body communicating with said seat, of a valve core adapted to fit rotatably into said seat, a handle on said core, and a tightening member removably connected to said core remote from said handle, the core having a lateral passageway positionable to communicate with the passage in said valve body, the valve core and its passageway being coated with a layer of rubber-like material, the handle having a peripheral rib compressibly engaged with said rubber-like layer, and said core having threaded means at the end remote from said handle for engaging the tightening member, said tightening member having portions engageable against the valve body when threadably engaged with said valve core.

References Cited in the file of this patent

UNITED STATES PATENTS

| 545,769 | Bowman | Sept. 3, 1895 |
| 868,756 | Bell | Oct. 22, 1907 |
| 948,075 | Richard | Feb. 1, 1910 |
| 2,571,925 | Mueller | Oct. 16, 1951 |